Aug. 25, 1970
J. C. SAMMIS
3,525,901
FLUORESCENT LAMP STARTING AND OPERATING
CIRCUIT WITH A PULSE STARTER
Filed Feb. 13, 1968
2 Sheets-Sheet 1
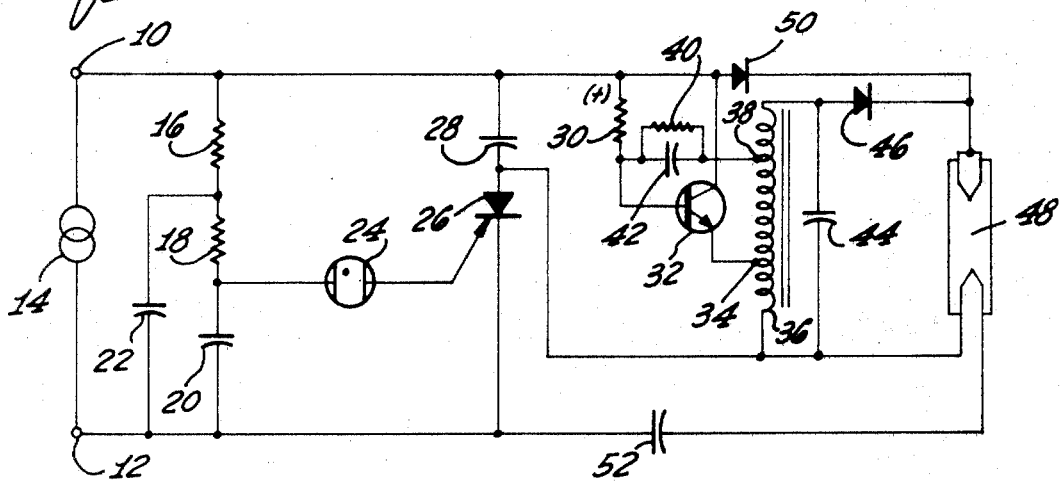
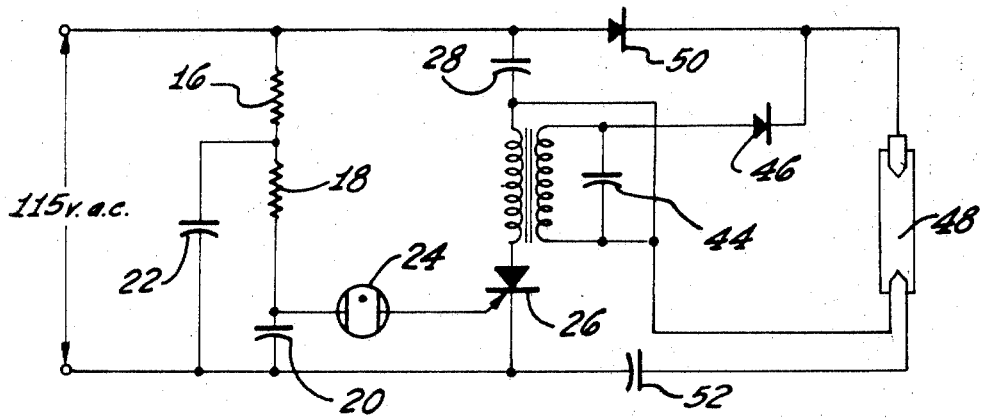
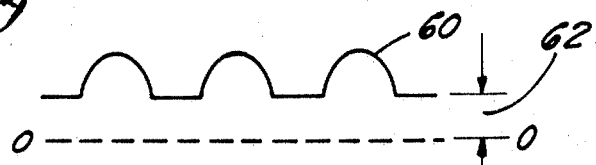
INVENTOR
John C. Sammis
By Smyth, Roston & Pavitt
ATTORNEYS

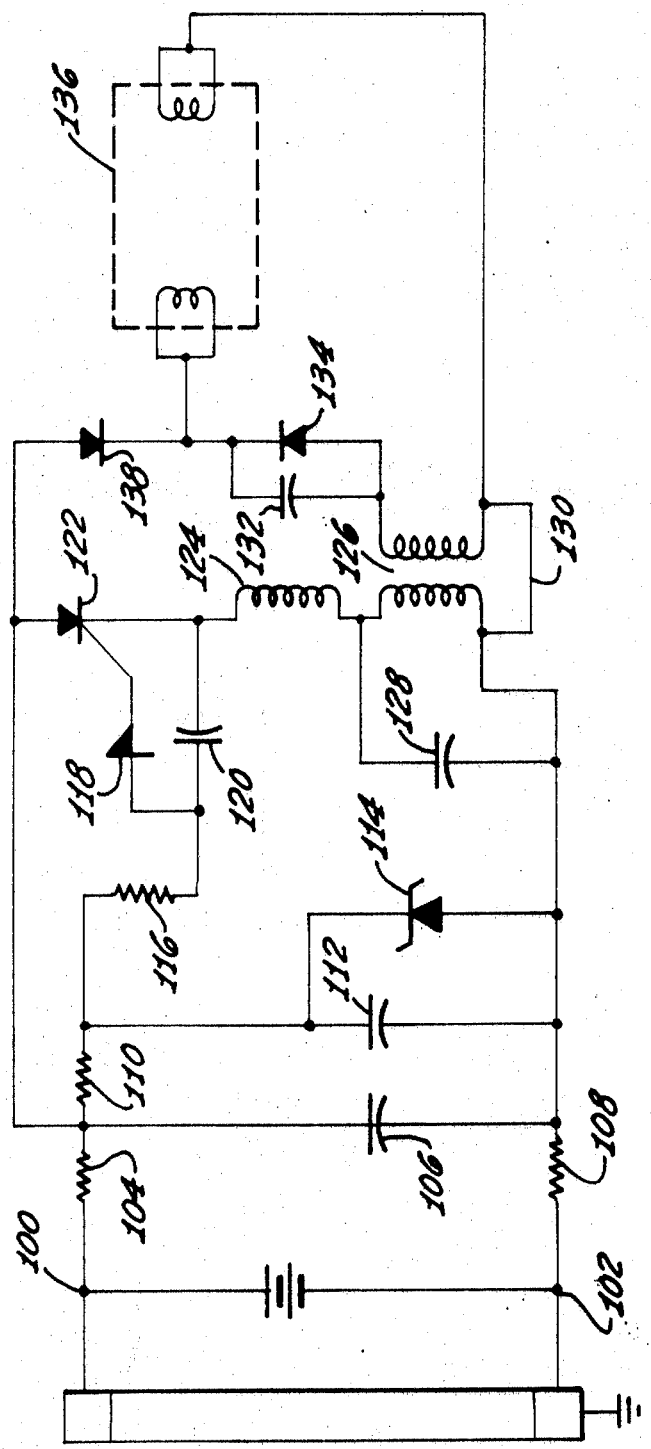

United States Patent Office 3,525,901
Patented Aug. 25, 1970

3,525,901
FLUORESCENT LAMP STARTING AND OPERATING CIRCUIT WITH A PULSE STARTER
John C. Sammis, West Covina, Calif., assignor to Microdot, Inc., South Pasadena, Calif., a corporation of California
Filed Feb. 13, 1968, Ser. No. 705,187
Int. Cl. H05b 41/23, 41/232
U.S. Cl. 315—105
14 Claims

ABSTRACT OF THE DISCLOSURE

This invention relates to a system for energizing a fluorescent tube with a direct voltage and with a voltage for periodically initiating the energizing of the tube so that the direct voltage will be effective to energize the tube. The periodic energizing may occur from an alternating voltage of ultrasonic frequency. The direct voltage and the alternating voltage of ultrasonic frequency may be produced from a conventional power supply having a relatively low frequency such as approximately 60 cycles or from a direct voltage. Means may also be provided for constantly energizing the filament of the fluorescent tube from the power supply, so that thermionic emission can be controlled independently.

---

This invention relates to a system of energizing a fluorescent tube with both direct current and alternating current. The invention also relates to a method of energizing the fluorescent tube from power supplies of either direct current or alternating current.

Fluorescent tubes are widely used to illuminate areas such as a room and have been in widespread use for a considerable number of years well in excess of a quarter of a century. During this time, considerable effort has been devoted to perfecting auxiliary devices to condition tube current. In spite of this, there are a number of basic weaknesses in the operation of the fluorescent tubes. For example, when choke ballasts are employed arrangements are required to heat both filaments in the tubes so that the tubes can be "started" (ionized). These ballast arrangements require power which may be considered as wasted since the power is not converted to luminescent energy in the tubes.

There are other disadvantages with fluorescent tubes in their present construction. One disadvantage is that the fluorescent tubes are energized only with alternating voltage and not with any direct voltage. This limits the efficiency in the operation of the tube since not all of the energy produced by the alternating voltage is converted to luminescence of the tube. Another disadvantage is that the tubes tend to flicker since they are energized at a relatively low frequency of alternating voltage such as 60 cycles per second. Furthermore, the tube cathodes are subjected to considerable electrical stress because of de-ionization in each half wave (120 times per second). This electrical stress tends to limit the life of the tubes.

This invention provides a system for energizing a tube primarily with direct voltage. In some embodiments of the invention, the system also energizes the tube with a sufficient amount of alternating voltage to initiate the energizing of the tube and to maintain the energizing of the tube so that the luminescence of the tube can be provided primarily by the direct voltage. The invention provides a system for energizing the fluorescent tube without any mechanical starters or without any coil-type ballast arrangements. Furthermore, the single cathode in the tube is constantly energized so that the life of the tube is prolonged. There is no flicker in the tube because the principal tube power is direct current. The system insures that the tube operates at a relatively high efficiency. The circuit itself is also highly efficient in supplying power to the fluorescent tube. Components are small, thereby facilitate miniaturized controls compared with conventional ballasts.

The system constituting this invention is adapted to receive voltage at 60 cycles from a conventional supply such as a power outlet in a room (FIGS. 1 and 3) or to receive a direct voltage (FIG. 4). This voltage is used to charge a capacitor in the alternate half-cycles of a particular polarity such as a positive polarity. When the capacitor voltage reaches a particular value, a switch such as a semi-conductor becomes conductive to produce a discharge of energy in the capacitor through the primary winding of an autotransformer. The autotransformer is connected in a circuit with a capacitor to be resonant at a relatively high frequency such as an ultrasonic frequency. In this way, the direct voltage across the capacitor is used to produce the ultrasonic frequency.

The direct voltage produced across the capacitor is also introduced across the tube to facilitate the energizing of the tube. In this way, the tube is energized by a combination of the direct voltage across the capacitor and the voltage produced at ultrasonic frequencies by the discharge of the capacitor.

In the drawings:

FIG. 1 is a circuit diagram of one embodiment of the invention, this embodiment operating from the application of an alternating voltage of relatively low frequency;

FIG. 2 illustrates curves of voltage waveforms produced at strategic terminals by the system shown in FIG. 1;

FIG. 3 is a circuit diagram of a modification of the system shown in FIG. 1; and FIG. 4 is a circuit diagram of a second embodiment of the invention, this embodiment operating from the application of an alternating voltage of relatively low frequency.

In the embodiment shown in FIG. 1, a system is shown for energizing a fluorescent tube. The system includes a pair of terminals 10 and 12 adapted to receive voltage from a power supply 14, which may be adapted to provide power through a conventional house outlet at approximately 60 cycles and approximately 115 volts. A resistor 16, a resistor 18 and a capacitor 20 are connected in series between the terminals 10 and 12. A capacitor 22 may also be connected in parallel across the series combination of the resistor 18 and the capacitor 20.

A control member such as a neon tube 24 is connected between the terminal common to the resistor 18 and the capacitor 20 and the control element of a switching member such as a silicon controlled rectifier 26. The input element of the silicon controlled rectifier 26 is connected to the terminal 12 and a capacitor 28 is connected between the output element of the silicon controlled rectifier 26 and the terminal 10.

A resistor 30 is connected between the terminal 10 and the control element of a switching member such as the base of a semiconductor or transistor 32. The collector of the transistor 32 is connected directly to the terminal 10 and the emitter of the transistor is connected to an intermediate tap 34 in an autotransformer 36. The autotransformer may have a suitable type of core such as a resonant air core, a ferrite core or a powdered iron core. The autotransformer 36 includes a second intermediate tap 38 which has a common connection with first terminals of a resistor 40 and a capacitor 42. Second terminals of the resistor 40 and the capacitor 42 are common electrically with the base of the transistor 32.

The autotransformer 36 is in parallel with a capacitor 44 which is provided with a value to resonate with the autotransformer at a relatively high frequency such as a frequency in the ultrasonic range. However, the resonant frequency of the autotransformer 36 and the capacitor 44 can be chosen to be as low as 400 cycles per second. The anode of a diode 46 is connected to a terminal common to the autotransformer 36 and the capacitor 44, and the cathode of the diode is connected to the anode of a fluorescent tube 48. The anode of the fluorescent tube 48 is also connected to the cathode of a diode 50, the anode of which is common electrically with the terminal 10. The filament of the fluorescent tube 48 is in series with a capacitor 52 between the terminal 12 and the terminal common to the capacitor 28 and the silicon controlled rectifier 26.

In the positive half-cycles of voltage from the source 14, the capacitor 20 becomes charged to a positive value through a circuit including the power supply 14, the terminal 10, the resistors 16 and 18, the capacitor 20 and the terminal 12. When the capacitor 20 becomes charged to a particular value, the voltage produced across the neon tube 24 becomes sufficiently great so that the neon tube becomes conductive and the voltage across the capacitor is introduced instantaneously to the control element of the silicon controlled rectifier 26. This causes the silicon controlled rectifier 26 to become conductive and a current to flow through a circuit including the terminal 10, the capacitor 28, the input and output electrodes of the silicon controlled rectifier 26 and the terminal 12. This current causes the capacitor 26 to become charged during the positive half-cycles of voltage.

As the capacitor 28 becomes charged, the voltage on the output electrode of the silicon controlled rectifier 26 decreases. This voltage is introduced to the emitter of the transistor 32, which is normally non-conductive. When the voltage on the emitter of the transistor 32 decreases sufficiently relative to the voltage on the base of the transistor, the transistor 32 becomes conductive so as to provide, in effect, the closure of a switch. This causes the capacitor 28 to partially discharge through a circuit including the collector and emitter of the transistor 32 and the portion of the autotransformer 36 below the intermediate tap 34 in FIG. 1. Silicon controlled rectifier 26 is non-conductive until it is triggered to a state of conductivity in the next positive half-cycle of alternating voltage from the power supply 14.

When the capacitor 28 discharges through the transistor 32 and the autotransformer 36, a pulse of energy is produced in the autotransformer. This pulse of energy has a relatively high frequency, partly because of the resonant circuit provided by the autotransformer 36 and the capacitor 44. The voltage produced by this pulse of energy is relatively high because of the voltage amplification produced in the autotransformer across the full number of turns in the autotransformer. The positive portions of this voltage are introduced through the diode 46 to the fluorescent tube 48.

The filament of the fluorescent tube 48 is constantly being heated through a circuit including the power supply 14, the capacitor 28, the filament and the capacitor 52. Since the filament is being constantly heated, the fluorescent tube 48 is always conditioned for thermionic emission. In view of this, the introduction of the alternating voltage at ultrasonic frequencies to the fluorescent tube 48 through the diode 46 causes ionization of the gas in the tube to be produced and the tube to be energized. The alternating voltage introduced at relatively high frequencies to the fluorescent tube 48 is illustrated at 60 in FIG. 2. The fluorescent tube 48 also receives through the diode 50 the direct voltage produced across the capacitor 28. This direct voltage is illustrated at 62 in FIG. 2. In this way, the fluorescent tube receives an alternating voltage to initiate the energizing of the tube and to facilitate the energizing of the tube and primarily receives a direct voltage, after the initial energizing of the tube, to maintain the energizing of the tube.

It is desirable for the alternating voltage introduced to the fluorescent tube 48 to be at a relatively high frequency such as in the ultrasonic range. The frequency of this voltage has to be sufficiently high so that the fluorescent tube will not become completely de-ionized between the successive cycles of the alternating voltage introduced to the fluorescent tube. One reason is that the direct voltage introduced to the fluorescent tube is not at sufficient levels to reliably ionize the tube by itself. It will be appreciated that the alternating voltage is introduced to the fluorescent tube only at the peaks of the alternating voltage since the alternating voltage is less in amplitude than the direct voltage at voltages below the peaks.

The introduction of direct voltage to the fluorescent tube 48 is advantageous for certain reasons. One reason is that the light produced in the tube is proportional to the average energy in the tube. As will be appreciated, the average energy from an alternating voltage is considerably less than the energy produced by the peak amplitude in an alternating voltage whereas the energy produced by a direct voltage remains substantially constant. Furthermore, the direct voltage is introduced to the tube at all times whereas the alternating voltage is introduced only in the cycles of positive polarity and is not even introduced to the tube during the complete time of the positive half-cycles.

The system described above has certain important advantages. One advantage is that the filament of the fluorescent tube 48 is heated at all times so that the tube 48 is ready to be energized at all times. By eliminating "cold starts" this tends to increase the life of the tube and to provide for an optimum efficiency in the operation of the tube throughout the complete life of the tube. Since the filament of the tube 48 is heated at all times, there is no necessity to maintain a high self-heating tube current during "cold" emission.

Another advantage of the system constituting this invention is that no mechanical starters are required. For example, no switching arrangements are required to heat the filament initially. Furthermore, no ballast transformer is required to insure proper operation of the tube. Since no ballast transformer is required, problems of improper operation of the ballast transformer and leakage of the ballast transformer during improper operation are eliminated.

In the system constituting this invention, a steady light is produced since the fluorescent tube 48 is energized primarily by direct voltage and secondarily by voltage at a relatively high frequency such as in the ultrasonic range. This is in contrast to the fluorescent tubes now in use since the fluorescent tubes are energized entirely at a relatively low frequency such as 60 cycles. Furthermore, the energizing of the tube primarily at direct voltage and secondarily at alternating voltages of a relatively high frequency causes the operation of the tube to be more efficient than in the prior art. This efficiency of the direct voltage relative to the efficiency of the alternating voltage is increased because of the tendency for the production of light by the fluorescent tube to decrease at the peaks of the alternating voltage.

The system constituting this invention also has other advantages. One advantage is that system has greatly reduced noises in the radio frequencies. This results in part from the fact that the fluorescent tube 48 is energized primarily by direct voltage. The production of noises at radio frequencies is undesirable since it tends to interfere with the reception of signals by radio receivers in the vicinity. Such interference is especially undesirable in the vicinity of military applications.

By initially energizing the tube with a high frequency signal and also applying a direct voltage to the tube, the tube can become energized by a direct voltage of relatively low magnitude. This results from the fact that the tube is already energized by the application of the alternating voltage to the tube so that the resistance of the tube is fairly low. In this way, the direct voltage applied to the tube to maintain the energizing of the tube between successive pulses of the alternating signals is sufficiently low so that the tube cannot become damaged by the application of the direct voltage.

The embodiment shown in FIG. 3 operates in a manner similar to the embodiment shown in FIG. 1 and includes components connected in a relationship similar to that shown in FIG. 1. Because of this, the components in FIG. 3 are provided with similar numerical indications to the embodiments shown in FIG. 1.

In the embodiment shown in FIG. 3, the autotransformer 36 is replaced by a transformer 60 having primary and secondary windings. The primary winding of the transformer is connected to the capacitor 28 and the input electrode of the silicon controlled rectifier 26 in a manner similar to the connections to the portion of the autotransformer 36 between the tap 34 and the bottom terminal of the transformer in FIG. 1. The secondary of the transformer is connected between the diode 46 and the filament of the fluorescent tube 48 in a manner similar to the connections across all of the turns of the autotransformer in FIG. 1.

Although a filament heater is shown as being included in the embodiments shown in FIGS. 1 and 3, it will be appreciated that the tube can become energized in the thermionic mode without the inclusion of a filament or heater. This can be accomplished by suitable impedance matching of the transformer to the tube under cold cathode conditions.

The embodiment of the invention shown in FIG. 4 is adapted to provide a direct voltage to a pair of terminals 100 and 102. The direct voltage is applied to a charging circuit including a resistor 104, a capacitor 106 and a resistor 108 in series across the terminals 100 and 102. A resistor 110 and a capacitor 112 are in series across the capacitor 106. A Zener diode 114 is in parallel with the capacitor 112.

One terminal of a resistor 116 is connected to the terminal common to the resistor 110 and the capacitor 112, and a second terminal of the resistor is connected to one terminal of a four-layer "trigger" semiconductor or transistor 118 and to one terminal of a capacitor 120. The second terminal of the four-layer transistor 118 is connected to the control electrode of a silicon controlled rectifier 122. The transistor 118 operates as a unidirectional member in controlling the introduction of a signal from the capacitor 106 to the control electrode of the silicon controlled rectifier 122.

The input electrode of the silicon controlled rectifier 122 is connected to the terminal common to the resistors 104 and 110 and the capacitor 106, and the output terminal of the silicon controlled rectifier 122 is connected to the second terminal of the capacitor 120.

A choke 124 and the primary winding of a transformer 126 are in series between the output terminal of the silicon controlled rectifier 122 and the terminal common to the capacitor 106 and the resistance 108. A capacitor 128 is connected across the primary winding of the transformer 126 to provide a resonance at relatively high frequencies.

A lead 130 connects the negative terminals of the primary and secondary windings of the transformer 126. The positive terminal of the secondary winding in the transformer 126 is connected to the parallel combination of a capacitor 132 and a diode 134. The cathode of the diode 134 is connected to the anode of a fluorescent tube 136. The anode of the tube 136 is also connected to the cathode of a diode 138, the anode of which is connected to the terminal common to the resistors 104 and 110 and the capacitor 106. The cathode of the tube 136 is connected to the lead 130.

In the embodiment shown in FIG. 4, the direct voltage between the terminals 100 and 102 causes the capacitor 112 to become charged through a circuit including the resistor 104, the capacitor 106 and the resistor 108. When the capacitor 112 becomes charged to a particular value, it breaks down the four-layer transistor 118 so that a positive voltage is introduced to the control electrode of the silicon controlled transistor 122. This causes the silicon controlled rectifier 122 to become conductive so that current flows through a circuit including the capacitor 106, the silicon controlled rectifier 122, the coil 124 and the primary winding of the transformer 126. The initiation of a flow of current through this circuit causes a voltage pulse to be produced across the primary winding of the transformer 126. This voltage pulse is provided with characteristics to provide signals at a relatively high frequency such as in the ultrasonic range.

The voltage produced in the primary winding of the transformer 126 is induced in the secondary winding and is introduced between the cathode and anode of the tube 136 to initiate an ionization of the tube. This ionization is instrumental in initiating the producton of visible light in the tube. The visible light in the tube is continued until the production of the next pulse in the transformer 126 by the introduction of a positive voltage across the transistor 118. In this way, a combination of alternating or pulsed voltage at a relatively high frequency and a direct voltage is introduced to the tube 136 to provide a luminescence of the tube.

It is possible that the mercury ions in the tube may migrate under the impetus of the direct voltage applied to the tube so as to move toward the cathode. This would eventually produce a deficiency of mercury at the anode of the tube so as to produce a darkening at the anode of the tube. It is desirable to prevent the mercury from accumulating at the cathode of the tube. One way of accomplishing this is to heat the cathode of the fluorescent tube more than the anode of the tube in the embodiments described above so that the mercury will tend to return to the anode of the tube. This can be accomplished by disposing the package containing the electronics at the cathode of the tube. Another way of accomplishing this is to dispose the fluorescent tube vertically with the cathode above the anode so that the mercury will tend to return toward the cathode.

The magnitude of the current produced by the direct voltage applied to the tube can be controlled by varying the frequency of the alternating signal applied to the tube in the embodiments described above. As the frequency of the alternating signal is decreased, the collision of ions in the tube tends to decrease. This tends to increase the impedance in the tube so that the current through the tube decreases.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for energizing a fluorescent tube having a filament for emitting charged particles to obtain an energizing of the tube and obtain a fluorescence of the tube in accordance with such energizing of the tube,
   first means for providing an alternating voltage,
   second means coupled to the first means for converting the alternating voltage to a direct voltage,
   third means coupled to the second means for introducing a current to the filament to energize the filament, fourth means coupled to the second means for introducing the direct voltage across the tube to energize the tube, fifth means responsive to the direct voltage for producing a signal having alternating components at a relatively high frequency, and sixth means responsive to the signal for introducing the signal across the tube to facilitate the energizing of the tube.

2. The combination set forth in claim 1 wherein the fifth means is operative to amplify the signal having alternating components before the signal is introduced to the tube.

3. The combination set forth in claim 2 wherein the fifth means includes a switch having first and second states and biased to operate in the first state and responsive to a particular difference between the voltage from the second means and the alternating voltage from the first means to become operative in the second state for the production of the signal having the alternating components.

4. In combination for energizing a fluorescent tube having a filament for emitting charged particles to obtain an energizing of the tube and obtain a fluorescence of the tube in accordance with such energizing of the tube, first means for providing an alternating voltage, a first storage member, second means coupled to the first means and the first storage member for charging the first storage member with energy in half cycles of the alternating voltage of a first polarity, third means coupled to the storage member for introducing the energy in the storage member to the filament of the fluorescent tube to heat the filament to obtain an emission of charged particles by the filament, fourth means coupled to the storage member for using the energy in the storage member to produce signals having alternating components at a particular frequency, fifth means coupled to the fourth means for introducing the signals across the tube to initiate an energizing of the tube, and sixth means coupled to the storage member for introducing the energy in the storage member across the tube to facilitate the energizing of the tube.

5. The combination set forth in claim 4, including a first switch member having first and second states of operation and normally operative in the first state and responsive to the alternating voltage to become operative in the second state upon the occurrence of a particular polarity and magnitude in the alternating voltage and coupled to the storage member to obtain a charging of energy in the storage member in the second state of operation of the storage member and connected to the fourth means to become triggered to the first state upon the production of the signals having the alternating components.

6. The combination set forth in claim 5 wherein a second switch has first and second states and wherein the second switch is biased to operate in the first state and wherein the second switch is responsive to a particular difference in voltage between the first storage member and the first means to become operative in the second state and wherein the second switch is included in the fourth means to obtain the production of the signals having the alternating components.

7. In combination for energizing a fluorescent tube having a filament for emitting charged particles to obtain an energizing of the tube and obtain a fluorescence of the tube in accordance with such energizing of the tube, first means for providing an alternating voltage, a storage capacitor, second means coupled to the storage capacitor and the first means for charging the storage capacitor in half cycles of the alternating voltage of a first polarity, third means coupled to the storage capacitor and the first means and operative in the half cycles of the first polarity for producing signals at a first frequency, fourth means coupled to the third means for introducing the signals to the fluorescent tube to initiate an energizing of the tube in the half cycles of the first polarity, fifth means coupled to the storage capacitor for energizing the filament to facilitate the emission of charged particles by the filament, and sixth means coupled to the storage capacitor for introducing the energy in the storage capacitor across the filament for facilitating the energizing of the fluorescent tube.

8. The combination set forth in claim 7 wherein a first switch is provided with conductive and non-conductive states and is normally in the non-conductive state and is responsive to a particular amplitude and polarity of the alternating voltage to become triggered to the conductive state and wherein the first switch is included in the second means and is connected to the storage capacitor to obtain a charge of the storage capacitor in the conductive state and is connected to the third means to become non-conductive upon the production of the signals.

9. In combination for energizing a fluorescent tube to obtain a fluorescence of the tube in accordance with such energizing of the tube, first means for providing an alternating voltage, second means responsive to the alternating voltage for converting the alternating voltage to a direct voltage, third means responsive to the alternating voltage and to the direct voltage for producing a voltage having alternating components of first and second opposite polarities at a relatively high frequency, fourth means responsive to the voltage having the alternating components for introducing such voltage to the fluorescent tube to energize the tube upon each occurrence of the alternating components of the first polarity, and fifth means responsive to the direct voltage for introducing such direct voltage to the fluorescent tube for enhancing the energizing of the tube.

10. The combination set forth in claim 9 wherein the third means produces the voltage with alternating components of first and second opposite polarities at ultrasonic frequencies.

11. In combination for energizing a fluorescent tube to obtain a fluorescence of the tube in accordance with such energizing of the tube, first means for providing a direct voltage, second means responsive to the direct voltage for producing a voltage having alternating components of first and second opposite polarities at a relatively high frequency, third means responsive to the voltage having the alternating components of the first polarity for introducing such voltage to the fluorescent tube to energize the tube upon each occurrence of the voltage having the alternating components of the first polarity, and fourth means responsive to the direct voltage for introducing such direct voltage to the fluorescent tube for enhancing the energizing of the tube.

12. The combination set forth in claim 11 wherein the second means produces the voltage with alternating components of the first and second opposite polarities at ultrasonic frequencies.

13. In combination for energizing a fluorescent tube for emitting charged particles to obtain an energizing of the tube and obtain a fluorescence of the tube in accordance with such energizing of the tube, first means for providing a direct voltage, a storage capacitor, second means coupled to the storage capacitor and the first means for charging the storage capacitor to a particular value, third means coupled to the storage capacitor and responsive to the charging of the storage capacitor to the particular value for producing signals at a first frequency, fourth means coupled to the third means for introducing the signals at the first frequency to the fluorescent tube to initiate an energizing of the tube, and fifth means coupled to the first means for introducing the direct voltage to the fluorescent tube to facilitate the energizing of the fluorescent tube.

14. The combination set forth in claim 13 wherein the third means includes a silicon controlled rectifier.

References Cited

UNITED STATES PATENTS

| 3,096,464 | 7/1963 | Lemmers | 315—105 |
| 3,189,790 | 6/1965 | Nuckolls | 315—174 X |
| 3,334,270 | 8/1967 | Nuckolls | 315—171 |
| 3,354,350 | 11/1967 | Kappenhagen et al. | 315—205 |
| 3,365,648 | 1/1968 | Benjamin | 321—10 |
| 3,403,293 | 9/1968 | Michelsen | 315—168 |

JAMES W. LAWRENCE, Primary Examiner

C. R. CAMPBELL, Assistant Examiner

U.S. Cl. X.R.

307—305; 315—183, 207, 289